United States Patent
Wang et al.

(10) Patent No.: US 9,249,042 B2
(45) Date of Patent: Feb. 2, 2016

(54) PROCESS AND APPARATUS FOR REFINING MOLTEN GLASS

(71) Applicant: Owens-Brockway Glass Container Inc., Perrysburg, OH (US)

(72) Inventors: Zhongming Wang, Ypsilanti, MI (US); Terence K. G. Howse, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 273 days.

(21) Appl. No.: 13/782,638

(22) Filed: Mar. 1, 2013

(65) Prior Publication Data

US 2014/0245793 A1    Sep. 4, 2014

(51) Int. Cl.
| | |
|---|---|
| C03B 5/20 | (2006.01) |
| C03B 5/225 | (2006.01) |
| C03B 5/187 | (2006.01) |
| C03B 5/26 | (2006.01) |

(52) U.S. Cl.
CPC ............... *C03B 5/2252* (2013.01); *C03B 5/187* (2013.01); *C03B 5/20* (2013.01); *C03B 5/2257* (2013.01); *C03B 5/26* (2013.01)

(58) Field of Classification Search
CPC ........ C03B 5/20; C03B 5/2252; C03B 5/2257
USPC ..................... 65/134.2, 134.9, 346
See application file for complete search history.

(56) References Cited

U.S. PATENT DOCUMENTS

| | | | |
|---|---|---|---|
| 1,760,371 A * | 5/1930 | Morton ........................... | 65/341 |
| 2,485,851 A | 10/1949 | Stevens | |
| 2,936,549 A | 5/1960 | Stinnes et al. | |
| 3,261,677 A | 7/1966 | Plumat | |
| 4,559,072 A | 12/1985 | Harcuba | |
| 4,780,122 A | 10/1988 | Schwenninger | |
| 6,332,339 B1 | 12/2001 | Kawaguchi et al. | |
| 6,460,376 B1 | 10/2002 | Jeanvoine et al. | |
| 6,536,238 B2 | 3/2003 | Kawaguchi et al. | |
| 6,739,152 B2 | 5/2004 | Jeanvoine et al. | |
| 7,565,819 B2 | 7/2009 | Jeanvoine et al. | |
| 7,624,595 B2 | 12/2009 | Jeanvoine et al. | |
| 2002/0062664 A1 | 5/2002 | Schmitt et al. | |

(Continued)

FOREIGN PATENT DOCUMENTS

| | | |
|---|---|---|
| AT | 379793 B | 2/1986 |
| DE | 10200233 | 4/2003 |

(Continued)

OTHER PUBLICATIONS

PCT Int. Search Report and Written Opinion, Int. Serial No. PCT/US2014/017104, Int. Filing Date: Feb. 19, 2014, Applicant: Owens-Brockway Glass Container Inc., Mail Date: May 8, 2014.

*Primary Examiner* — Matthew Daniels
*Assistant Examiner* — Cynthia Szewczyk

(57) ABSTRACT

A process and an apparatus for refining molten glass by introducing, a stream of unrefined molten glass into a controlled environment distributing the stream of molten glass over a flow surface, and collecting the stream of molten glass from a downstream end of the flow surface to form a body of molten glass having a free surface exposed to the controlled environment. The controlled environment, may have a pressure less than ambient atmospheric pressure, such that introducing the stream of molten glass into the controlled environment causes gaseous inclusions in the stream of molten glass to rise to a surface thereof and escape.

29 Claims, 3 Drawing Sheets

(56) References Cited

U.S. PATENT DOCUMENTS

2002/0162358 A1 11/2002 Jeanvoine et al.
2010/0126223 A1 5/2010 Thomas
2011/0016922 A1 1/2011 Kitamura et al.

FOREIGN PATENT DOCUMENTS

| JP | S57149839 | 9/1982 |
| JP | S6237678 | 2/1987 |
| WO | 2013011835 | 1/2013 |

\* cited by examiner

PROCESS AND APPARATUS FOR REFINING MOLTEN GLASS

The present disclosure relates to a process and an apparatus for refining molten glass, and particularly to a process and an apparatus for continuously removing gaseous inclusions from a flowing stream of molten glass.

BACKGROUND AND SUMMARY OF THE DISCLOSURE

Silica-based glass, such as soda-lime-silica glass, is prevalent in the manufacture of glass containers and other articles. Molten glass used to make such articles is conventionally prepared by melting various glass-forming materials in a furnace or tank at elevated temperature. The resulting molten glass typically contains gaseous inclusions, e.g., "blisters," "bubbles," or "seeds," which need to be removed. The process of removing gaseous inclusions from molten glass is referred to as "refining," and conventionally involves continued heating of the molten glass at high temperatures and for long periods of time to allow the gaseous inclusions to gradually rise to the surface of the molten glass and escape. This process is undesirably slow and requires high-energy input to maintain the molten glass at a suitably high temperature.

The general object of the present disclosure is to provide a process and an apparatus for continuously refining molten glass, which can increase the rate at which gaseous inclusions are removed from molten glass and thereby increase the efficiency of the refining process.

The present disclosure embodies a number of aspects that can be implemented separately from or in combination with each other.

A process for refining molten glass, in accordance with one aspect of the disclosure, includes: (a) introducing a stream of molten glass into a controlled environment; (b) distributing the stream of molten glass over a flow surface; (c) collecting the stream of molten glass from a downstream end of the flow surface to form a body of molten glass having a free surface exposed to the controlled environment; and (d) removing a stream of refined molten glass from the controlled environment at a location below the free surface of the body of molten glass.

A refining chamber for refining molten glass, in accordance with one aspect of the disclosure, includes: an inlet for receiving a stream of molten glass; a distribution section for distributing the stream of molten glass over a flow surface; a reservoir section for collecting the stream of molten glass from the distribution section to form a body of molten glass; and an outlet located below a free surface of the body of molten glass for discharging a stream of refined molten glass from the refining chamber. The refining chamber may further include an evacuation system for creating a sub-atmospheric pressure environment within the refining chamber.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
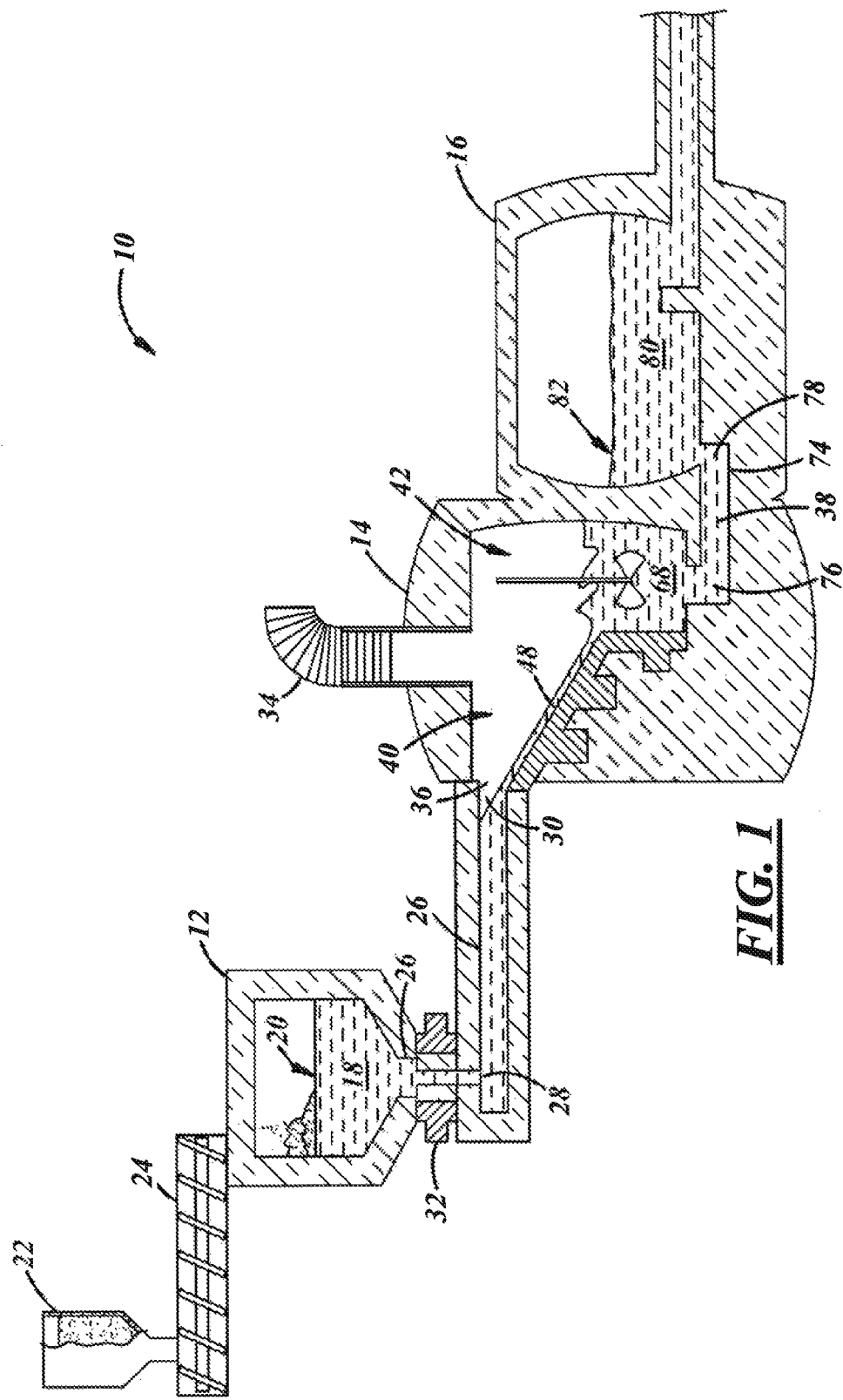
FIG. 1 is a schematic illustration of a side sectional view of a glass furnace in accordance with an exemplary embodiment of the present disclosure, and includes a melting chamber, a refining chamber, and a homogenization chamber.

The process and apparatus for refining molten glass disclosed herein may be used to refine various silica-based glass compositions, including, for example, soda-lime-silica glass. According to embodiments of the present disclosure, a stream of unrefined molten glass having an undesirable amount of gaseous inclusions is supplied to an apparatus for refining molten glass, and a stream of refined molten glass having a reduced amount of gaseous inclusions is discharged from the apparatus. The process and apparatus of the present disclosure may be incorporated into various glass manufacturing processes and various glass furnace designs, including, but certainly not limited to, the exemplary glass manufacturing processes and glass furnace designs shown in the drawings and described hereinbelow.

FIG. 1 illustrates a glass furnace 10 for continuously melting, refining and homogenizing a silica-based glass composition in accordance with an exemplary embodiment of the present disclosure. The glass furnace 10 includes a melting chamber 12, a refining chamber 14 downstream of the melting chamber 12, and a homogenization chamber 16 downstream of the refining chamber 14. Glass-forming materials are supplied to the melting chamber 12, where they are heated, for example, at a temperature in the range of about 1300 degrees Celsius to about 1500 degrees Celsius, to produce a first body of molten glass 18 having a first free surface 20 exposed to an atmospheric pressure environment, e.g., an environment at ambient atmospheric pressure. After the glass-forming materials are initially melted, the molten glass will contain an undesirable amount of gaseous inclusions, and thus will be "unrefined." To remove or at least reduce the amount of gaseous inclusions therein, a stream of unrefined molten glass is preferably removed from the melting chamber 12 and transported to the refining chamber 14.

Melting of the glass-forming materials in the melting chamber 12 may be performed on a batch or continuous basis, and may be accomplished using any suitable heating techniques. In the embodiment shown in FIG. 1, glass-forming materials are continuously supplied to the melting chamber 12 from a hopper 22 via a batch charger 24. The glass-forming materials may then be melted in the melting chamber 12 using electricity and/or by the combustion of fossil fuels. If electrical heating is used, the melting chamber 12 may include a plurality of electrodes, which directly or indirectly supply heat to the glass-forming materials to produce the first body of molten glass 18. If combustion heating is used, the melting chamber 12 may include one or more air-fueled and/or oxygen-fueled burners, which may be placed in the roof or sides of the melting chamber 12, or may be submerged within the molten glass itself.

Unrefined molten glass may be supplied to the refining chamber 14 of the present disclosure by any suitable means. In the embodiment shown in FIG. 1, molten glass is supplied to the refining chamber 14 from the melting chamber 12 by way of a passageway 26 having an inlet 28 and an outlet 30. In this embodiment, a pressure differential is established across the passageway 26 such that a continuous stream of molten glass can flow from the melting chamber 12, through the passageway 26, and into the refining chamber 14 without use of a pump or other mechanical device. The pressure differential across the passageway 26 is at least partially established by positioning the inlet 28 of the passageway 26 below the first free surface 20 of the first body of molten glass 18. In this arrangement, the pressure at the inlet 28 of the passageway 26 is directly related to the hydrostatic head or height of the molten glass above the inlet 28. In other suitable embodiments, molten glass may be removed from the melting chamber 12 and supplied to the refining chamber 14 by pump or by siphon. A heater 32 may be located near or around a portion of the passageway 26 to heat the stream of molten glass as it flows from the melting chamber 12 to the refining chamber 14. For example, heat may be applied to the stream of molten glass to maintain or raise the temperature of the molten glass such that it exhibits a suitable viscosity for transport through the passageway 26. The stream of molten glass may suitably be heated to a temperature in the range of about 1450 degrees Celsius to about 1600 degrees Celsius as it flows from the melting chamber 12 to the refining chamber 14.

Figure 2:
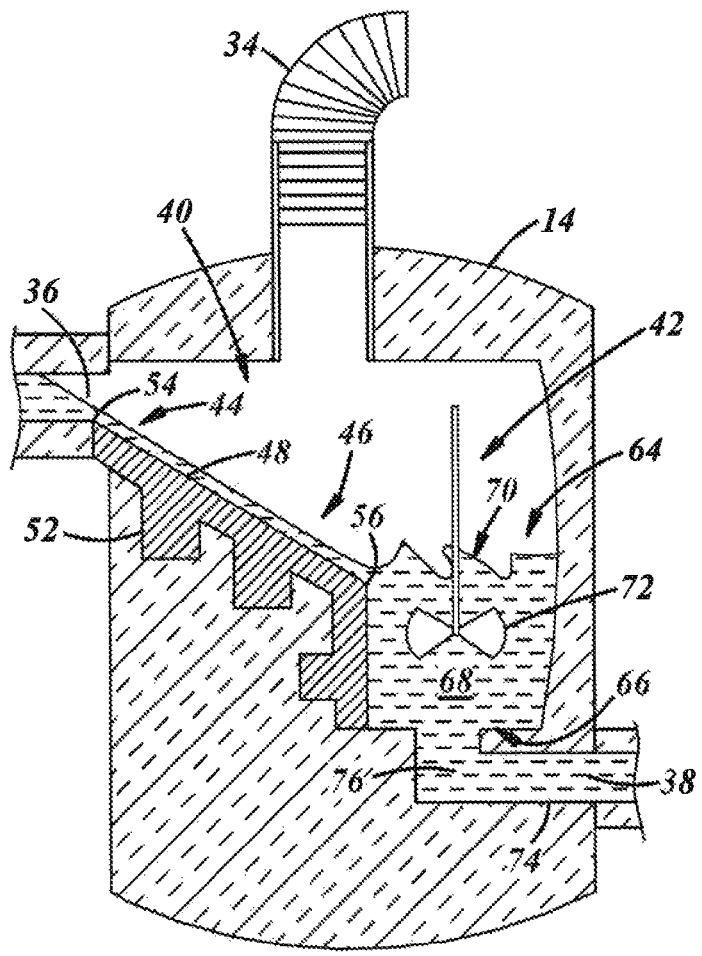
FIG. 2 is a schematic illustration of a side sectional view of a refining chamber in accordance with an exemplary embodiment of the present disclosure, and includes an inlet, an outlet, a distribution section, and a reservoir section.

Referring now to FIGS. 1 and 2, the refining chamber 14 of the glass furnace 10 is an enclosed chamber in which molten glass is refined by distributing it out over a surface having an increasing surface area and exposing it to a controlled environment to expeditiously remove gaseous inclusions from the molten glass.

The term "controlled environment," as used herein, means an environment in which the temperature, pressure, humidity, and/or composition may be controlled. According to embodiments of the present disclosure, the pressure within the refining chamber 14 may be controlled to produce a sub-atmospheric environment within the refining chamber 14. The term "sub-atmospheric," as used herein, means an environment having a pressure less than ambient atmospheric pressure, e.g., less than about 760 Torr. In one specific embodiment, the pressure within the refining chamber 14 may be controlled to produce a sub-atmospheric environment having a pressure in the range of about 10 Torr to about 760 Torr, as this pressure range may help increase the rate at which gaseous inclusions are removed from the molten glass within the refining chamber 14. The pressure within the refining chamber 14 may be controlled by incorporating an evacuation system into the design of the refining chamber 14, which may include a vacuum pump and an evacuation conduit 34. The temperature within the refining chamber 14 also may be controlled to help increase the rate at which gaseous inclusions are removed from the molten glass. Temperature control within the refining chamber 14 may be accomplished by incorporating one or more air-fueled and/or oxygen-fueled burners into the design of the refining chamber 14.

The refining chamber illustrated in FIGS. 1 and 2 includes an inlet 36 located in an upper portion of the refining chamber 14 for receiving a stream of unrefined molten glass, and an outlet 38 located in a lower portion of the refining chamber 14 for discharging a stream of refined molten glass therefrom. Molten glass is preferably held within the refining chamber 14 for a time sufficient to reduce the number of gaseous inclusions in the molten glass such that the molten glass is suitable for use in downstream forming operations. The residence time, or the time a volume of molten glass remains within the refining chamber 14, is controlled by controlling the rate at which molten glass enters and exits the refining chamber 14. In one embodiment, the rate at which molten glass enters and exits the refining chamber 14 is controlled by adjusting the pressure within the refining chamber 14. In this embodiment, the rate at which molten glass enters the refining chamber 14 may be substantially the same as the rate at which molten glass exits the refining chamber 14. In another embodiment, flow control valves may be positioned at the inlet 36 and/or the outlet 38 of the refining chamber 14 to independently control of the rate at which molten glass enters and exits the refining chamber 14. In either embodiment, the rate at which molten glass enters and exits the refining chamber 14 may be controlled such that it is the same or different from the rate at which the glass-forming materials are supplied to the melting chamber 12.

Figure 3:
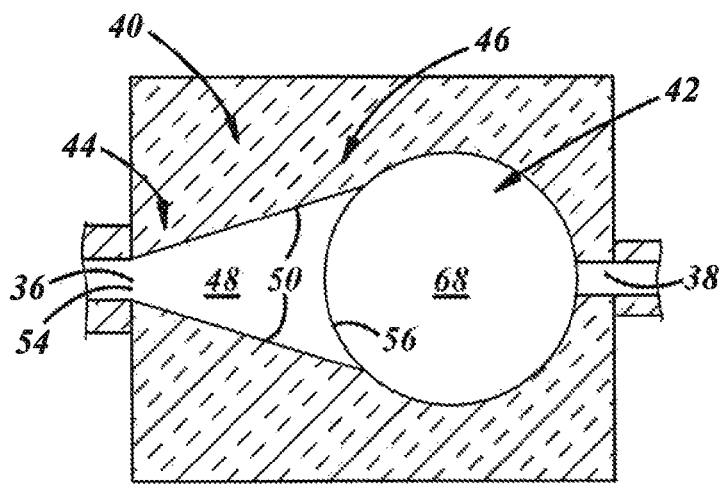
FIG. 3 is a top sectional view of the refining chamber of FIG. 2.

As best shown in FIGS. 2 and 3, the refining chamber 14 includes two sections, a distribution section 40 and a reservoir section 42, which together define a path for a stream of molten glass to flow from the inlet 36 to the outlet 38 of the refining chamber 14. First, the stream of molten glass flows through the distribution section 40, where it is distributed over a larger surface area. Then, the molten glass enters the reservoir section 42, where it is collected and held for a suitable time before it is discharged from the refining chamber 14.

The distribution section 40 has an upstream end 44, a downstream end 46, and a flow surface 48 upon which the stream of molten glass can flow from the inlet 36 of the refining chamber 14 to the reservoir section 42. The flow surface 48 of the distribution section 40 may be at least partially defined by walls 50, which divert from each other with respect to a flow direction of the stream of molten glass. The distribution section 40 also may include one or more heaters to help maintain or increase the temperature of the stream of molten glass as it flows over the flow surface 48 and into the reservoir section 42. In the embodiment shown in FIGS. 1 and 2, a plurality of heaters 52 are positioned below the flow surface 48, which supply heat to the stream of molten glass from below. The stream of molten glass may suitably be heated to a temperature in the range of about 1300 degrees Celsius to about 1600 degrees Celsius as it flows over the flow surface 48.

The flow surface 48 extends from the upstream end 44 to the downstream end 46 of the distribution section. 40, and includes a leading edge 54 and a trailing edge 56. The flow surface 48 may slope in a generally downward direction and also may increase in surface area as it extends from its leading edge 54 to its trailing edge 56. The flow surface 48 is configured in this way such that, when the stream of molten glass flows over the flow surface 48, it is distributed over a larger surface area, which decreases the thickness of the stream while also increasing the surface area of the stream that is exposed to the controlled environment within the refining chamber 14. As used herein, the "thickness" of the stream of molten glass refers to the height of the stream of molten glass above the flow surface 48. The thickness of the stream of molten glass flowing over the flow surface 48 may be controlled, for example, by adjusting the rate at which molten glass enters the refining chamber 14, the slope angle of the flow surface 48, and the rate at which the surface area of the flow surface 48 increases. A suitable thickness for the stream of molten glass flowing over the flow surface 48 is in the range of about 2 cm to about 30 cm.

The slope of the flow surface 48 may or may not be uniform along its entire length. For example, the slope of the flow surface 48 may be adjusted to accommodate various flow rates, thicknesses, and viscosities of molten glass, as well as various designs and shapes of the flow surface itself. In suitable embodiments, the flow surface 48 may slope in a generally downward direction so that gravity may help accelerate the stream of molten glass down the flow surface 48 and towards the reservoir section 42. For example, the flow surface 48 may have a slope that makes an angle of greater than 0 degrees with the horizontal. In particular, the flow surface 48 may have a slope that makes an angle of up to and including 90 degrees with the horizontal.

Figure 4A:
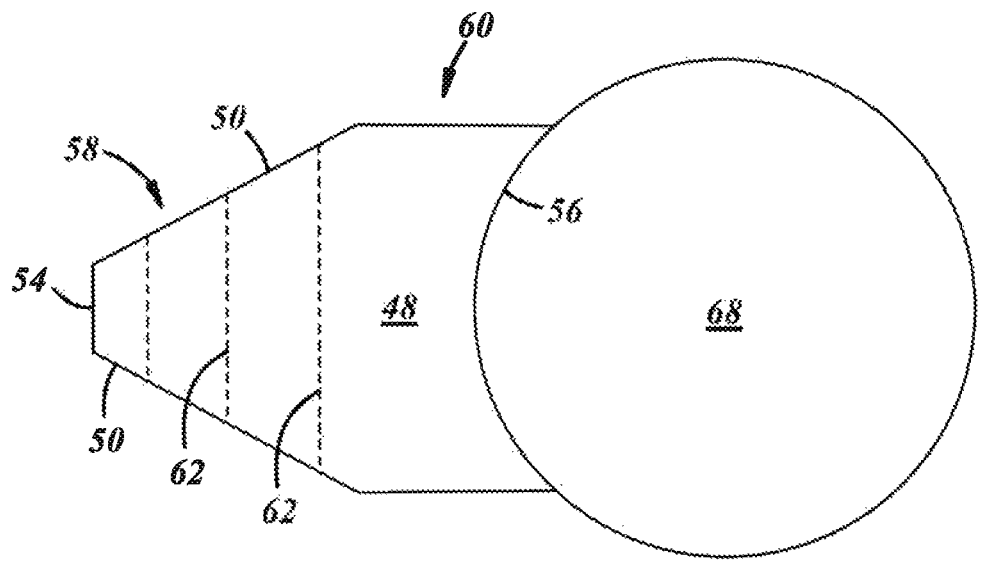
FIG. 4A is a schematic illustration of a top view of a portion of a refining chamber in accordance with one embodiment of the present disclosure.
Figure 4B:
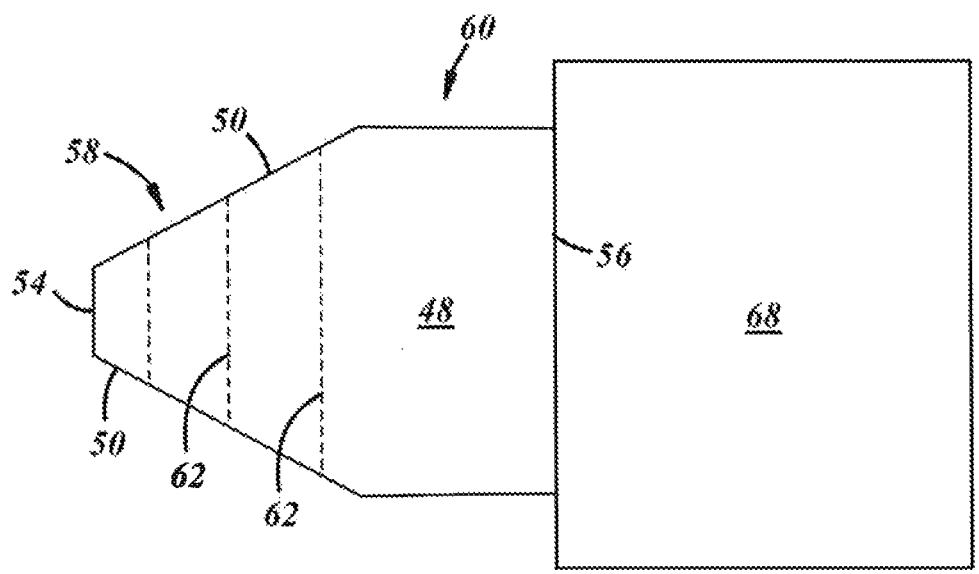
FIG. 4B is a schematic illustration of a top view of a portion of a refining chamber in accordance with another embodiment of the present disclosure.

As shown in FIG. 3, the surface area of the flow surface 48 may be increased by increasing or expanding the width of the flow surface 48 as it extends from its leading edge 54 to its trailing edge 56. However, the flow surface 48 may or may not expand in width along its entire length. For example, as shown in FIGS. 4A and 4B, the flow surface 48 may have an expanding width section 58 and a constant width section 60. The flow surface 48 also may include one or more flow diverters 62 positioned within the path of the stream of molten glass to help distribute the stream of molten glass over the flow surface 48.

The reservoir section 42 of the refining chamber 14 is located downstream of the distribution section 40 and is configured to receive a continuous stream of molten glass from the downstream end 46 of the distribution section 40. Molten glass is received at an open end 64 of the reservoir section 42, and is collected at a submerged end 66 of the reservoir section 42 to form a second body of molten glass 68 having a second free surface 70 exposed to the controlled environment within the refining chamber 14. Accordingly, the open end 64 of the reservoir section 42 is located above the second free surface 70, and the submerged end 66 of the reservoir section 42 is located below the second free surface 70 of the second body of molten glass 68. The trailing edge 56 of the flow surface 48 may be positioned above or below the second free surface 70 of the second body of molten glass 68, depending on the level or height of the second body of molten glass 68 within the reservoir section 42. A stirrer 72 or other suitable device may optionally be located within the reservoir section 42 to help mix or agitate the second body of molten glass 68. Molten glass held within the reservoir section 42 contains a reduced amount of gaseous inclusions, and is thus suitable for use in a variety downstream glass manufacturing processes.

A stream of refined molten glass is preferably removed from the reservoir section 42 of the refining chamber 14 at a location below the second free surface 70 of the second body of molten glass 68. For example, a stream of refined molten glass may be removed from the refining chamber 14 via an opening in the submerged end 66 of the reservoir section 42. The stream of refined molten glass may be removed from the reservoir section 42 by any suitable means, for example, by creation of a pressure differential and/or by mechanical pump.

In the embodiment shown in FIG. 1, the refining chamber 14 is fluidly connected to the homogenization chamber 16 via a submerged passageway 74 having an inlet 76 and an outlet 78. A third body of molten glass 80 is held within the homogenization chamber 16 and has a third free surface 82 exposed to an atmospheric pressure environment, e.g., an environment at ambient atmospheric pressure. The inlet 76 of the submerged passageway 74 is located below the second free surface 70 of the second body of molten glass 68, and the outlet 78 of the submerged passageway 74 is located below the third free surface 82 of the third body of molten glass 80. In this embodiment, a pressure differential is established across the submerged passageway 74 such that a continuous stream of refined molten glass flows from the reservoir section 42, through the submerged passageway 74, and into the homogenization chamber 16 without use of a pump or other mechanical device. In order for the stream of refined molten glass to flow into the homogenization chamber 16, the hydrostatic head or height of the second body of molten glass 68 above the inlet 76 of the submerged passageway 74 is controlled such that the pressure at the inlet 76 of the submerged passageway 74 is greater than the pressure resulting at the outlet 78 of the submerged passageway 74. The submerged passageway 74 also acts as a "trap," in that the molten glass within the submerged passageway 74 creates a barrier between the refining chamber 14 and the homogenization chamber 16, which prevents air and/or other gases from entering the refining chamber 14 via the outlet 38 and potentially interfering with the controlled environment in the refining chamber 14.

Molten glass in the homogenization chamber 16 is thoroughly mixed to chemically and thermally homogenize the glass, and to cool the glass down to a suitable temperature for downstream forming operations (e.g., less than about 1200 degrees Celsius for glass container forming operations).

There thus has been disclosed a process and an apparatus for continuously refining a silica-based glass composition that fully satisfies all of the objects and aims previously set forth. The disclosure has been presented in conjunction with presently preferred embodiments, and alternatives and modifications have been discussed. Other alternatives and modifications readily will suggest themselves to persons of ordinary skill in the art in view of the foregoing description. The disclosure is intended to embrace all such modifications and variations as fall within the spirit and broad scope of the appended claims.

The invention claimed is:

1. A process for refining molten glass including:
   (a) introducing molten glass into a controlled environment;
   (b) distributing the molten glass over and down a downward sloping flow surface having a length extending in a flow direction of the molten glass and a width extending transverse to the flow direction of the molten glass, wherein the width of the flow surface expands along at least a portion of the length of the flow surface such that a surface area of the molten glass is increased as the molten glass flows over and down the flow surface;
   (c) collecting the molten glass from a downstream end of the flow surface to form a body of molten glass having a free surface exposed to the controlled environment; and
   (d) discharging molten glass from the controlled environment at a location below the free surface of the body of molten glass.

2. The process as set forth in claim 1 wherein step (a) includes introducing molten glass into the controlled environment at a location above the free surface of the body of molten glass.

3. The process as set forth in claim 1 wherein step (a) includes introducing molten glass into a sub-atmospheric environment.

4. The process as set forth in claim 3 wherein a residence time for a volume of molten glass in the sub-atmospheric environment is controlled by controlling the pressure within the sub-atmospheric environment.

5. The process as set forth in claim 1 wherein the molten glass introduced into the controlled environment in step (a) has a thickness, and step (b) includes reducing the thickness of the molten glass.

6. The process as set forth in claim 1 wherein the flow surface has a trailing edge located above the free surface of the body of molten glass, and step (c) includes collecting molten glass from the trailing edge of the flow surface.

7. The process as set forth in claim 1 wherein the flow surface has a trailing edge located below the free surface of the body of molten glass, and step (c) includes collecting molten glass from the trailing edge of the flow surface.

8. The process as set forth in claim 1 wherein step (c) includes collecting the molten glass within a reservoir section.

9. The process as set forth in claim 8 wherein the molten glass is received at an open end of the reservoir section.

10. The process as set forth in claim 8 wherein the molten glass is collected above a submerged end of the reservoir section.

11. The process as set forth in claim 10 wherein molten glass is discharged from the controlled environment in step (d) via an opening in the submerged end of the reservoir section.

12. The process as set forth in claim 1 wherein molten glass is discharged from the controlled environment in step (d) without use of a mechanical pump.

13. The process as set forth in claim 1 wherein step (b) includes heating the molten glass as the molten glass is distributed over the flow surface.

14. A refining chamber for refining molten glass including:
an inlet for receiving molten glass;
a distribution section for distributing molten glass over a downward sloping flow surface, the flow surface having a length extending in a molten glass flow direction and a width extending transverse to the molten glass flow direction, wherein the width of the flow surface expands along at least a portion of the length of the flow surface such that the flow surface increases in surface area as the flow surface extends in a downward direction;
a reservoir section that receives and collects molten glass from the distribution section;
and an outlet through which molten glass is discharged, said outlet being located below a free surface of a body of molten glass that has been collected within the reservoir section.

15. The refining chamber as set forth in claim 14 wherein the distribution section and the reservoir section together define a path for molten glass to flow from the inlet to the outlet of the refining chamber.

16. The refining chamber as set forth in claim 14 further including an evacuation system including a vacuum pump and an evacuation conduit for producing a sub-atmospheric environment within the refining chamber.

17. The refining chamber as set forth in claim 14 wherein the flow surface extends from the inlet of the refining chamber to the reservoir section.

18. The refining chamber as set forth in claim 14 wherein the flow surface increases in surface area from a leading edge to a trailing edge thereof.

19. The refining chamber as set forth in claim 14 wherein the flow surface has an expanding width section.

20. The refining chamber as set forth in claim 14 wherein the flow surface has an expanding width section and a constant width section.

21. The refining chamber as set forth in claim 14 wherein the flow surface is at least partially defined by walls, which divert from each other with respect to the molten class flow direction.

22. The refining chamber as set forth in claim 14 wherein the reservoir section includes an open end through which molten glass is received from the distribution section.

23. The refining chamber as set forth in claim 14 wherein the reservoir section includes a submerged end in which molten glass is collected.

24. The refining chamber as set forth in claim 23 wherein the submerged end of the reservoir section includes an opening through which molten glass is discharged from the reservoir section.

25. The refining chamber as set forth in claim 14 further including a device for stirring or agitating a body of molten glass that has been collected within the reservoir section.

26. An apparatus for making glass including the refining chamber set forth in claim 14.

27. The apparatus as set forth in claim 26 wherein the inlet of the refining chamber is configured to receive molten glass from a melting chamber and is positioned below a free surface of a body of molten glass held within the melting chamber.

28. The apparatus as set forth in claim 26 including:
a homogenization chamber positioned downstream of the refining chamber in which molten glass is homogenized; and
a submerged passageway through which molten glass can flow from the refining chamber to the homogenization chamber, the submerged passageway having an inlet and an outlet positioned below a body of molten glass held within the refining chamber and below a body of molten glass held within the homogenization chamber such that the submerged passageway provides a trap for preventing gas flow through the submerged passageway into the refining chamber.

29. An apparatus for making glass including:
a melting chamber for melting glass-forming materials to produce a first body of molten glass having a first free surface exposed to an atmospheric pressure environment;
an enclosed refining chamber positioned downstream of the melting chamber for refining molten glass, the refining chamber including:
an inlet for receiving molten glass from the melting chamber;
a distribution section for distributing the molten glass over a downward sloping flow surface, the flow surface having a length extending in a flow direction of the molten glass and a width extending transverse to the flow direction of the molten glass, wherein the width of the flow surface expands along at least a portion of the length of the flow surface such that the flow surface increases in surface area as the flow surface extends in a downward direction;
a reservoir section for collecting the molten glass from the distribution section to form a second body of molten glass having a second free surface exposed to a sub-atmospheric pressure environment, and
an outlet located below the second free surface of the second body of molten glass;
a passageway for supplying molten glass from the melting chamber to the refining chamber, the passageway having an inlet and an outlet positioned below the first free surface of the first body of molten glass and above the second free surface of the second body of molten glass;
a homogenization chamber positioned downstream of the refining chamber for homogenizing a third body of molten glass having a third free surface exposed to an atmospheric pressure environment; and
a submerged passageway for supplying molten glass from the refining chamber to the homogenization chamber, the submerged passageway having an inlet and an outlet positioned below the second and third free surfaces of the second and third bodies of molten glass such that the submerged passageway provides a trap for preventing gas flow through the submerged passageway into the refining chamber.

\* \* \* \* \*